United States Patent [19]

Mohr et al.

[11] 4,118,185
[45] Oct. 3, 1978

[54] PROCESS FOR DYEING AND PRINTING NICKEL-CONTAINING POLYOLEFINS

[75] Inventors: Reinhard Mohr, Offenbach am Main; Kurt Hohmann, Neu-Isenburg, both of Fed. Rep. of Germany

[73] Assignee: Hoechst Aktiengesellschaft, Frankfurt am Main, Fed. Rep. of Germany

[21] Appl. No.: 727,649

[22] Filed: Sep. 29, 1976

[30] Foreign Application Priority Data

Oct. 3, 1975 [DE] Fed. Rep. of Germany ....... 2544247

[51] Int. Cl.$^2$ ........................ C09B 45/00; D06P 3/79
[52] U.S. Cl. ..................................... 8/42 D; 8/41 D; 8/180; 8/DIG. 9
[58] Field of Search ................... 8/42 D, 180, DIG. 9

[56] References Cited

U.S. PATENT DOCUMENTS 3,998,803  12/1976  Burkhard et al. .................... 260/156

FOREIGN PATENT DOCUMENTS 632,653    5/1963   Belgium.
625,429   12/1962   Belgium.
1,444,257 10/1969   Fed. Rep. of Germany.
1,296,857 11/1972   United Kingdom.

OTHER PUBLICATIONS

Hartley, P. N., "Coloration of Polypropylene," International Dyer, 1965, 134, pp. 541–543.
Hartley, P. N. International Dyer and Textile Priner, 1965, 134, pp. 541–543.
"The Ring Index" Second Edition (American Chemical Society) p. 5.

Primary Examiner—A. Lionel Clingman
Attorney, Agent, or Firm—Connolly and Hutz

[57] ABSTRACT

It has been found that nickel-containing polyolefins can be dyed and printed in deep colors and with very good to excellent fastness properties when a thiazole-azo-(3-cyano-2,6-dihydroxypyridine) dyestuff is used.

13 Claims, No Drawings

PROCESS FOR DYEING AND PRINTING NICKEL-CONTAINING POLYOLEFINS

It is known that azo dyestuffs having a determined constitution are suitable for the dyeing of textile material of nickel-containing polypropylene (cf. Belgian Patent Specification Nos. 625,429 and 632,653).

It has now been found that nickel-containing polyolefins, preferably textile material of nickel-containing polyolefins, such as nickel-containing polyethylene, polypropylene or polyisobutylene, may be dyed and printed in deep shades of excellent fastness properties when an azo dyestuff of the general formula I

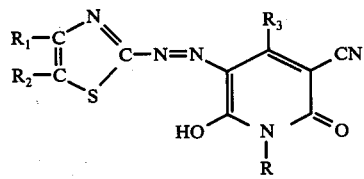

is used.

The various formula members of formula (I) are: R is hydrogen, a lower alkyl radical optionally substituted, for example by 1, 2 or 3, preferably 1 substituents selected from the group chlorine, cyano, hydroxy, carbalkoxy groups having 2 to 5 carbon atoms, carboxylic acid amide and phenyl radical, or wherein R represents an aryl radical, for example phenyl radical which may be substituted for example by 1, 2 or 3, preferably 1 substituent selected from the group chlorine, lower alkyl, lower alkoxy, cyano, carbonamide and sulfonamide, $R_1$ is hydrogen, a lower alkyl radical optionally substituted, for example, by preferably 1 or 2 groups of carboxylic acid alkyl ester of 2 to 5 carbon atoms and carboxylic acid amide, or is an aryl radical, for example a phenyl radical, which may be substituted for example by 1, 2 or 3, preferably 1 substituent selected from the group chlorine, lower alkyl, lower alkoxy, cyano, carboxylic acid amide and sulfonamide groups, $R_2$ is hydrogen, lower alkyl radical optionally substituted for example by carboxylic acid alkyl ester of 2 to 5 carbon atoms or carboxylic acid amide, or is an aryl radical, for example phenyl radical, which may be substituted for example by 1, 2 or 3, preferably 1 substituent selected from the group chlorine, lower alkyl, lower alkoxy, cyano, carboxylic acid amide and sulfonamide groups, or is a halogen atom such as chlorine or bromine, a nitro, cyano, thiocyanate, carbalkoxy group of preferably 2 to 5 carbon atoms, an acyl group, for example an alkylcarbonyl group having 2 to 5 carbon atoms, or a carbonamide group optionally substituted for example by 1 or 2 alkyl radicals having 1 to 4 carbon atoms or by 1 alkyl of 1 to 4 C-atoms and one phenyl or by one phenyl radical, and $R_3$ is a lower alkyl radical of 1 to 4 carbon atoms.

Especially suitable are dyestuffs of the formula I, wherein R is hydrogen, an alkyl radical having 1 to 4 carbon atoms, a β-hydroxyalkyl or benzyl radical, $R_1$ is hydrogen, an alkyl radical having 1 to 4 carbon atoms, a carbalkoxymethyl radical having 1 to 4 carbon atoms in the alkoxy radical or a phenyl radical, $R_2$ is hydrogen, a carbalkoxy radical having 1 to 4 carbon atoms, an acetyl, β-cyanoethyl or carboxylic acid phenylamide radical and $R_3$ is an alkyl radical having 1 to 4 carbon atoms.

Especially suitable are dyestuffs of the formula (I), wherein $R_1$ and $R_2$ each represents hydrogen, $R_3$ stands for a methyl or ethyl group and R is methyl, ethyl, propyl or butyl.

The polyolefins to be used according to the invention preferably contain as nickel compounds nickel salts, for example nickel stearate, nickel acetate or nickel-thiocarbamate. The metal-modified polyolefins generally contain such compounds as a protection against UV-irradiation in amounts of from about 0,05 to 2% by weight.

According to general, usually known methods, the dyestuff of formula (I) is brought into contact with the material to be dyed and fixed on it at a temperature of about 60° C.

For the dyeing, the dyestuffs of formula (I) are preferably used in finely divided form, and dyeing is carried out with addition of dispersing agents, such as soap, sulfite cellulose waste liquor or synthetic detergents. It is generally expedient to convert the dyestuffs to be used before dyeing into a dyeing composition. This dyeing composition should contain a dispersing agent and finely divided dyestuff in such a form that, when diluting the dyestuff composition with water, a fine dispersion is formed. Such dyestuff compositions may be obtained in known manner, for example by re-precipitating the dyestuff from sulfuric acid and grinding the suspension thus obtained with sulfite waste liquor, optionally also by grinding the dyestuff in very efficient grinding devices in a dry or wet form with or without the addition of a dispersing agent during the grinding process.

Dyeing is expediently effected from an aqueous dispersion at a temperature close to the boiling point of the dyebath, preferably at boiling temperature in the presence of a wetting agent. It has proved advantageous to adjust the dyebath to a slightly acidic medium, preferably to a pH of from 4 to 7, for example by the addition of slightly acidic substances, as for example acetic acid, formic acid or ammonium sulfate. It can be supposed that during the dyeing process the dyestuff reacts with the metal compounds contained in the fibre while forming a metal complex.

According to the present process the dyestuffs indicated can be applied not only from a dyeing bath but also by padding or printing. For this purpose for example a printing ink is used which contains besides the auxiliaries usual in printing industry such as wetting and thickening agents, the finely dispersed dyestuff.

According to the process of the present invention bright intense dyeings and prints having excellent fastness properties, especially an excellent fastness to light as well as a very good fastness to wetting, to solvents, to rubbing and to exhause gas are obtained.

The dyestuffs used may be synthetized in usual manner by coupling diazotized a 2-aminothiazole with a corresponding 6-hydroxy-2-pyridone.

The following Examples illustrate the invention. Parts and percentages are by weight unless stated otherwise. The relationship of part by weight to part by volume is as kilogram to liter.

EXAMPLE 1

10 Parts of a polypropylene yarn of staple fibre of an individual titer of 3 den and a content of 0.75 percent of the nickel compound of 3,3'-dioxy-5,5'-dioctyl-diphenyl-sulfone are washed for 30 minutes at 60° C. with an aqueous solution which contains per liter 0.3 g of the addition product of 1 mol of nonyl phenyl and 11 mols of ethylene oxide, then rinsed, and subsequently treated without intermediate drying in a bath which contains in 400 parts of water 0.1 part of acetic acid, 0.04 part of the sodium salt of a dibutyl-naphthalene-sulfonic acid, 0.3 parts of dinaphthyl-methane-sulfonic acid and 0.2 parts of the dyestuff of the formula

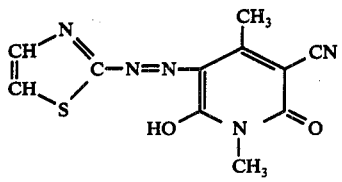

After dyeing for 10 minutes at room temperature the temperature of the dyebath is increased within 45 minutes to 100° C., and dyeing is continued at this temperature for 2 hours. Then the dyed yarn is rinsed hot and cold, washed for 30 minutes at 80° C. with an aqueous solution containing per liter 1 g of the addition product of 1 mol of nonyl phenol and 11 mols of ethylene oxide and 0.4 g of sodium carbonate, rinsed and dried. A red dyeing having a very good festness to light and to wetting is obtained.

The dyestuff used has been prepared as follows: 45.7 Parts of thio-urea are introduced into 225 parts of water and the mixture is heated to 75° C. Into the solution formed, 105 parts of a 45% aqueous chloroacetaldehyde solution are introduced dropwise at 75°–80° C.; the whole is stirred for 2 hours at about 80° C. and thereafter cooled to about 20°–25° C. After adding 225 parts of ice and 150 parts by volume of a 95% sulfuric acid, the sulfuric acid solution of 2-amino-thiazole is rapidly diazotized at 0°–5° C. with 120 parts by volume of a 5N-sodium nitrite solution. After stirring for some time the excess of nitrite is destroyed with amido-sulfonic acid, and the brown yellow diazo solution is introduced into a solution consisting of 82 parts of 1.4-dimethyl-3-cyano-6-hydrooxy-pyridone-2, 2000 parts by volume of water, 150 parts by volume of a 5N sodium hydroxide solution, 250 parts of crystallized sodium acetate and 3000 parts of ice. The coupling suspension is adjusted to pH 4 with sodium hydroxide solution; the crystalline dyestuff obtained is suction-filtered and washed with water. After drying at about 60° C. 125 parts of dyestuff of the above formula are obtained.

EXAMPLE 2

50 Parts of the dyestuff of the formula

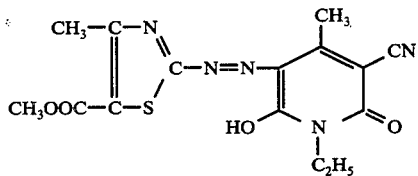

are dissolved in 300 parts of dimethylformamide. The solution is introduced, while stirring, into 600 parts of a 25% aqueous crystal gum thickening and mixed with 50 parts of ammonium sulfate. A nickel-containing polypropylene fabric is printed in film printing with the printing paste thus obtained. The printed fabric is dried and then steamed for 30 minutes at a pressure of 1.5 atmospheres gauge, then rinsed thoroughly, aftertreated for 30 minutes at 80° C. with an aqueous bath containing per liter 1 g of an addition product of about 10 mols of ethylene oxide on 1 mol of nonyl phenol and 0.5 g of calcinated sodium carbonate then rinsed with water, and dried. An intense red print having a good fastness to weting and to light is obtained.

The dyestuff used has been prepared as follows: 34.4 Parts of 2-amino-4-methyl-thiazole-5-carboxylic acid methyl ester are introduced into a mixture of 80 parts by volume of a 99% acetic acid, 45 parts by volume of water and 20 parts by volume of a 95% sulfuric acid. Diazotation is carried out with 60 parts of about 42.3% nitrosyl-sulfuric acid at 0° C. The yellow diazo solution is stirred for 30 minutes at 0°–5° C. and then introduced cautiously into a mixture consisting of 35.6 parts of 3-cyano-6-hydroxy-4-methyl-1-ethyl-pyridone-2, 350 parts by volume of N-methyl-pyrrolidone, 50 parts by volume of water and 40 parts by volume of a 5N sodium hydroxide solution.

Stirring of the resulting coupling suspension is continued for 30 minutes, and the mixture is diluted with 2500 parts by volume of ice water. After adjusting a pH value of about 4 with sodium hydroxide solution, the crystalline dyestuff is suction-filtered and washed with water. After drying at 60° C. 48 parts of dyestuff of the above formula are obtained.

EXAMPLE 3

10 Parts of a polypropylene yarn of staple fibres of an individual titer of 3 den and a content of nickel of 0.05 percent are washed for 30 minutes at 60° C. with an aqueous solution containing per liter 0.3 g of the addition product of 1 mol of nonyl phenol and 11 mols of ethylene oxide, then rinsed and subsequently treated without intermediate drying on a high-temperature-dyeing apparatus in a dyeing bath which contains in 400 parts of water 0.1 part of acetic acid, 0.04 part of the sodium salt of the dibutyl-naphthalene-sulfonic acid and 0.2 parts of the formula

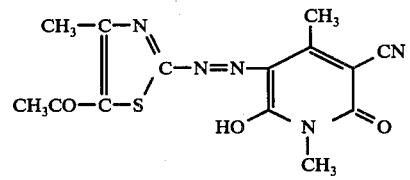

After dyeing for 10 minutes at room temperature the temperature of the dyebath is increased within 60 minutes to 120° C., and dyeing is continued for 2 hours at this temperature. Then the dyed yarn is rinsed hot and cold, washed for 30 minutes at 80° C. with an aqueous solution which contains per liter 1 g of the addition product of 1 mol of nonyl phenol and 11 mols of ethylene oxide as well as 0.4 g of sodium carbonate then rinsed with water and dried. A red dyeing having a very good fastness to light, to washing, to perspiration, to solvents and to rubbing is obtained.

The dyestuff used has been prepared as follows: 31.2 Parts of 2-amino-4-methyl-5-acetyl-thiazole are introduced into a mixture of 130 parts by volume of a 99% acetic acid, of 15 parts by volume of a 95% sulfuric acid and of 70 parts by volume of water and diazotized with 60 parts of a 42.3% nitrosyl-sulfuric acid at 0° C. The yellow diazo solution is stirred for about 30 minutes at 0°–5° C. and then introduced cautiously into a solution consisting of 32.8 parts of 1,4-dimethyl-3-cyano-6-hydroxy-pyridone-2 in 200 parts by volume of dimethylformamide, 30 parts by volume of 5N-sodium hydroxide solution and 30 parts by volume of water.

The resulting coupling suspension is stirred for 30 minutes, diluted with 2000 parts by volume of ice water, and the pH value is adjusted to 4 with sodium hydroxide solution. The crystalline dyestuff is suction-filtered and washed well with water. After drying at 60° C. 40 parts of dyestuff having the above formula are obtained.

The following Table contains a number of further dyestuffs of the formula II to be used according to the invention and the resulting shades of the polypropylene dyeings.

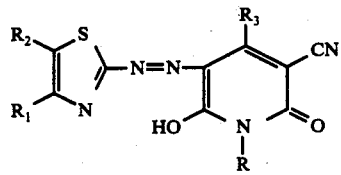
(II)

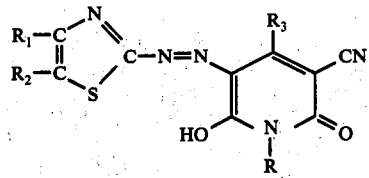

wherein R is hydrogen, lower alkyl, phenyl-(lower alkylene), phenyl-(lower-alkylene) substituted in the benzene nucleus by 1 to 2 substituents of the group consisting of chlorine, cyano, hydroxy, carbalkoxy having 2 to 5 carbon atoms and carboxylic acid amide, or R is phenyl or phenyl substituted by 1 or 2 substituents of the group consisting of chlorine, lower alkyl, lower alkoxy, cyano, carbonamide and sulfonamide, $R_1$ is hydrogen, lower alkyl, lower alkyl substituted by 1 or 2 substituents of the group consisting of carbalkoxy of 2 to 5 carbon atoms and carboxylic acid amide, or is phenyl or phenyl substituted by 1 or 2 substituents of Table

| R | $R_1$ | $R_2$ | $R_3$ | Shade |
|---|---|---|---|---|
| H | H | H | $CH_3$ | red |
| $C_2H_5$ | " | " | " | " |
| $C_3H_7$ | " | " | " | " |
| iso-$C_3H_7$ | " | " | " | " |
| $C_4H_9$ | " | " | " | " |
| $CH_3$ | " | " | $C_2H_5$ | " |
| " | $CH_3$ | " | $CH_3$ | " |
| " | —⌬ (phenyl) | " | " | " |
| —$C_2H_4OH$ | " | " | " | " |
| $CH_3$ | —$CH_2$—$COOC_2H_5$ | " | " | " |
| " | " | —$COOC_2H_5$ | " | " |
| $C_2H_5$ | $CH_3$ | —$COCH_3$ | " | " |
| H | " | " | " | " |
| —$CH_2$—⌬ (benzyl) | " | " | " | " |
| H | " | —$COOCH_3$ | " | " |
| $CH_3$ | " | " | " | " |
| " | " | —$COOC_2H_5$ | " | " |
| $CH_3$ | $CH_3$ | —$CH_2$—$CH_2$—CN | $CH_3$ | " |
| H | " | —CONH—⌬ (phenyl) | " | " |
| $CH_3$ | " | " | " | " |
| $C_2H_5$ | " | " | $C_2H_5$ | " |
| $CH_3$ | " | " | $C_3H_7$ | " |
| H | " | —$COOC_2H_5$ | $CH_3$ | " |
| —⌬ (phenyl) | | | | |
| $CH_3$ | " | " | " | " |

We claim:

1. A process for the dyeing and printing of nickel-containing polyolefin fiber which comprises bringing said material into contact with a dyestuff of the formula the group consisting of chlorine, lower alkyl, lower alkoxy, cyano, carboxylic acid amide and sulfonic acid amide, $R_2$ is hydrogen, lower alkyl, lower alkyl substituted by 1 or 2 substituents of the group consisting of carbalkoxy having 2 to 5 carbon atoms and carboxylic acid amide, or is phenyl or phenyl substituted by 1 or 2 substituents of the group consisting of chlorine, lower alkyl, lower alkoxy, cyano, carboxylic acid amide and sulfonic acid amide, or is halogen, nitro, cyano, thiocyanate, carbalkoxy having 2 to 5 carbon atoms, alkylcarbonyl having 2 to 5 carbon atoms, carbamoyl, carbamoyl mono- or disubstituted by 1 or 2 alkyl having 1 to 4 carbon atoms or by 1 alkyl of 1 to 4 carbon atoms and one phenyl or by phenyl, and $R_3$ is alkyl having 1 to 4 carbon atoms.

2. A process according to claim 1 wherein the dyestuff used is a dyestuff of the formula indicated in claim 1, in which R is hydrogen, alkyl having 1 to 4 carbon atoms, hydroxyalkyl, preferably β-hydroxyethyl, or benzyl, $R_1$ is hydrogen, alkyl having 1 to 4 carbon atoms, carbalkoxymethyl having 1 to 4 carbon atoms in the alkoxy moiety or phenyl, $R_2$ is hydrogen, carbalkoxy having 1 to 4 carbon atoms, acetyl, β-cyanoethyl or carboxylic acid phenyl amide, and $R_3$ is alkyl having 1 to 4 carbon atoms.

3. A process according to claim 1, wherein the dyestuff used is a dyestuff of the formula indicated in claim 1 wherein R is methyl, ethyl, propyl or butyl, $R_1$ and $R_2$ each stands for hydrogen and $R_3$ is methyl or ethyl.

4. A process according to claim 1 wherein the dyestuff used is a dyestuff of the formula indicated in claim 1 in which $R_1$ and $R_2$ each is hydrogen, R is methyl and $R_3$ is methyl.

5. A process according to claim 1 wherein the dyestuff used is a dyestuff of the formula indicated in claim 1 in which $R_1$ and $R_2$ each is hydrogen, R is ethyl and $R_3$ is methyl.

6. A process according to claim 1 wherein the dyestuff used is a dyestuff of the formula indicated in claim 1 in which $R_1$ and $R_2$ each is hydrogen, R is propyl and $R_3$ is methyl.

7. A process according to claim 1 wherein the dyestuff used is a dyestuff of the formula indicated in claim 1 in which $R_1$ and $R_2$ each is hydrogen, R is butyl and $R_3$ is methyl.

8. A process according to claim 1 wherein the dyestuff used is a dyestuff of the formula indicated in claim 1 in which $R_1$ and $R_2$ each is hydrogen, R is methyl and $R_3$ is ethyl.

9. A process according to claim 1 wherein the dyestuff used is a dyestuff of the formula indicated in claim 1 in which $R_1$ and $R_2$ each is hydrogen, R is ethyl and $R_3$ is ethyl.

10. A process according to claim 1 wherein the dyestuff used is a dyestuff of the formula indicated in claim 1 in which $R_1$ and $R_2$ each is hydrogen, R is propyl and $R_3$ is ethyl.

11. A process according to claim 1 wherein the dyestuff used is a dyestuff of the formula indicated in claim 1 in which $R_1$ and $R_2$ each is hydrogen, R is butyl and $R_3$ is ethyl.

12. Polyolefins which have been dyed or printed according to a process of claim 1.

13. Fibre materials of polyolefins which have been dyed or printed according to a process of claim 1.